United States Patent
Meyer et al.

(10) Patent No.: US 8,196,534 B2
(45) Date of Patent: Jun. 12, 2012

(54) VOLUMETRIC METERING SYSTEM WITH CLUTCH BASED SECTIONAL SHUT-OFF

(75) Inventors: Bradley J. Meyer, Minot, ND (US);
Keith L. Felton, Betteadorf, IA (US);
Charles T. Graham, Monument, CO (US)

(73) Assignee: Deere & Company, Moline, IL (US)

( * ) Notice: Subject to any disclaimer, the term of this patent is extended or adjusted under 35 U.S.C. 154(b) by 80 days.

(21) Appl. No.: 12/630,313

(22) Filed: Dec. 3, 2009

(65) Prior Publication Data

US 2011/0132244 A1  Jun. 9, 2011

(51) Int. Cl.
*A01C 7/00* (2006.01)
*A01C 9/00* (2006.01)

(52) U.S. Cl. .......................................... 111/182

(58) Field of Classification Search .................. 111/170, 111/171, 177–185
See application file for complete search history.

(56) References Cited

U.S. PATENT DOCUMENTS

| 2,585,005 | A | * | 2/1952 | Godshalk et al. ............. 320/150 |
| 3,365,983 | A | * | 1/1968 | Jeakle ........................... 475/160 |
| 5,078,066 | A | | 1/1992 | Lafferty |
| 7,571,688 | B1 | | 8/2009 | Friestad et al. |
| 7,775,843 | B1 | * | 8/2010 | Vanderhye ...................... 440/8 |
| 2008/0163807 | A1 | | 7/2008 | Dean et al. |
| 2009/0079624 | A1 | | 3/2009 | Dean et al. |

FOREIGN PATENT DOCUMENTS

| CA | 2286244 | 4/2001 |
| DE | 202005002495 | 5/2005 |
| EP | 1530891 | 5/2005 |

OTHER PUBLICATIONS

European Search Report received Apr. 12, 2011 (4 pages).

* cited by examiner

*Primary Examiner* — Christopher J. Novosad

(57) ABSTRACT

A volumetric meter for seed or fertilizer having a plurality of roller segments driven by a common drive shaft is provided with clutch mechanisms radially between each roller segment and the drive shaft to enable the roller segments to be individually shut-off to provide section or swath control to the machine.

9 Claims, 5 Drawing Sheets

US 8,196,534 B2

VOLUMETRIC METERING SYSTEM WITH CLUTCH BASED SECTIONAL SHUT-OFF

FIELD OF THE INVENTION

The present invention relates to a volumetric seed meter and in particular to such a seed meter having a clutch mechanism between a meter drive shaft and a meter roller segment to selectively turn off the roller segment to accomplish sectional meter shut-off.

BACKGROUND OF THE INVENTION

Volumetric meters are commonly used in agricultural seeding implements such as grain drills and air seeders to meter the seed. Volumetric meters are also used with fertilizer applicators. A volumetric meter often employs a meter roller contained within a housing that defines an inlet for receiving product from a tank, typically located above the meter roller, to feed seed into the housing by gravity. The meter roller is fluted so that as the roller is rotated, product from the tank is carried to an outlet in a controlled manner based on the size of the roller flutes and speed of rotation of the roller. From the meter housing, the seed is carried by a distribution system for dispensing to the soil. The distribution system typically includes a number of individual channels each receiving seed from a defined section of the meter roller. The meter roller is typically constructed of multiple roller segments mounted on a common drive shaft. Each roller segment directs product to an individual channel of the distribution system. The distribution system may be a gravity system that guides the seed as it falls downward from the meter to the soil. Alternatively, the distribution system may be pneumatic, using air flow to distribute the seed from the meter. A pneumatic system may also further divide the seed delivered from one roller segment into multiple, individual row distribution tubes.

In contrast to a volumetric seed meter, row crop planters use individual seed meters located at each row unit. These meters are supplied by either individual seed hoppers mounted to the row unit or supplied with seed from a central tank, often with a pneumatic system to deliver the seed. The seed meters, however, instead of metering the seed based on volume, singulate the seed and delivers a predetermined number of seeds, typically one, upon specified time/distance intervals. Recent products have been made available on row crop planters that enable the flow of seed to be shut-off at the individual row units. This is often accomplished by a clutch mechanism in the seed meter drive that is actuated to disengage the seed meter drive. An example of such is shown in U.S. Pat. No. 7,571,688. These have met with commercial success as customers seek to control costs by eliminating any double seeding which can occur at the edge of a field when the area remaining area to be seeded is not as wide as the planter or in a non-rectangular field where the rows do not all end at the same location or when crossing waterways that are not to be seeded. Since the seed shut-off is at the individual meter mounted on the row, there is only a short or no delay from the time the meter is shut-off to stoppage of the seed flow at the soil.

To provide a similar shut-off on an air, i.e. pneumatic, seeder, however, a number of unique challenges must be overcome that do not exist with a row crop planter. These challenges include: 1) if seed is stopped from flowing into the meter roller, there is a long delay until seed stops flowing at the discharge since the meter housing must empty before seed flow stops; 2) air seeders may mix multiple products within the airstream so that stopping the flow of seed to the ground by redirecting the flow after the seed is introduced into the air stream requires separation of the mixed products; 3) with some air seeders, the product tanks are pressurized during operation, further complicating the return of redirected product to the tank; and 4) if product flow from the meter roller is stopped but the roller continues to rotate, there is the possibility of damage to seed that is trapped in the roller.

One approach to providing a sectional meter shut-off in an air seeder is shown in US patent application publication number 2009/0079624, published Mar. 26, 2009. Slidable gates are positioned between the product storage tank and the meter roll. Individual actuators are provided to move each gate between open and closed positions. Because the gates are positioned between the storage tank and the meter, after activation of the shut-off actuators, product will continue to flow until the meter is emptied of product. This arrangement does nothing to address the first challenge listed above.

It is also known to in the context of a grain drill to provide a clutch axially adjacent at least one roller segment to stop one row from planting to create a tramline in a field as shown in U.S. Pat. No. 5,078,066. This approach, since the clutch is axially adjacent the roller segment can not be used in a meter roller where the roller segments are adjacent one another or closely spaced by divider walls that separate product flow into channels as the product enters the meter.

SUMMARY OF THE INVENTION

The present invention provides selective control to individual roller segments in a volumetric metering system having a meter roller with closely spaced roller segments. The selective control is provided by individual clutch mechanisms located radially within each roller segment, between the roller segment and the drive shaft.

DESCRIPTION OF THE PREFERRED EMBODIMENT

Figure 1:
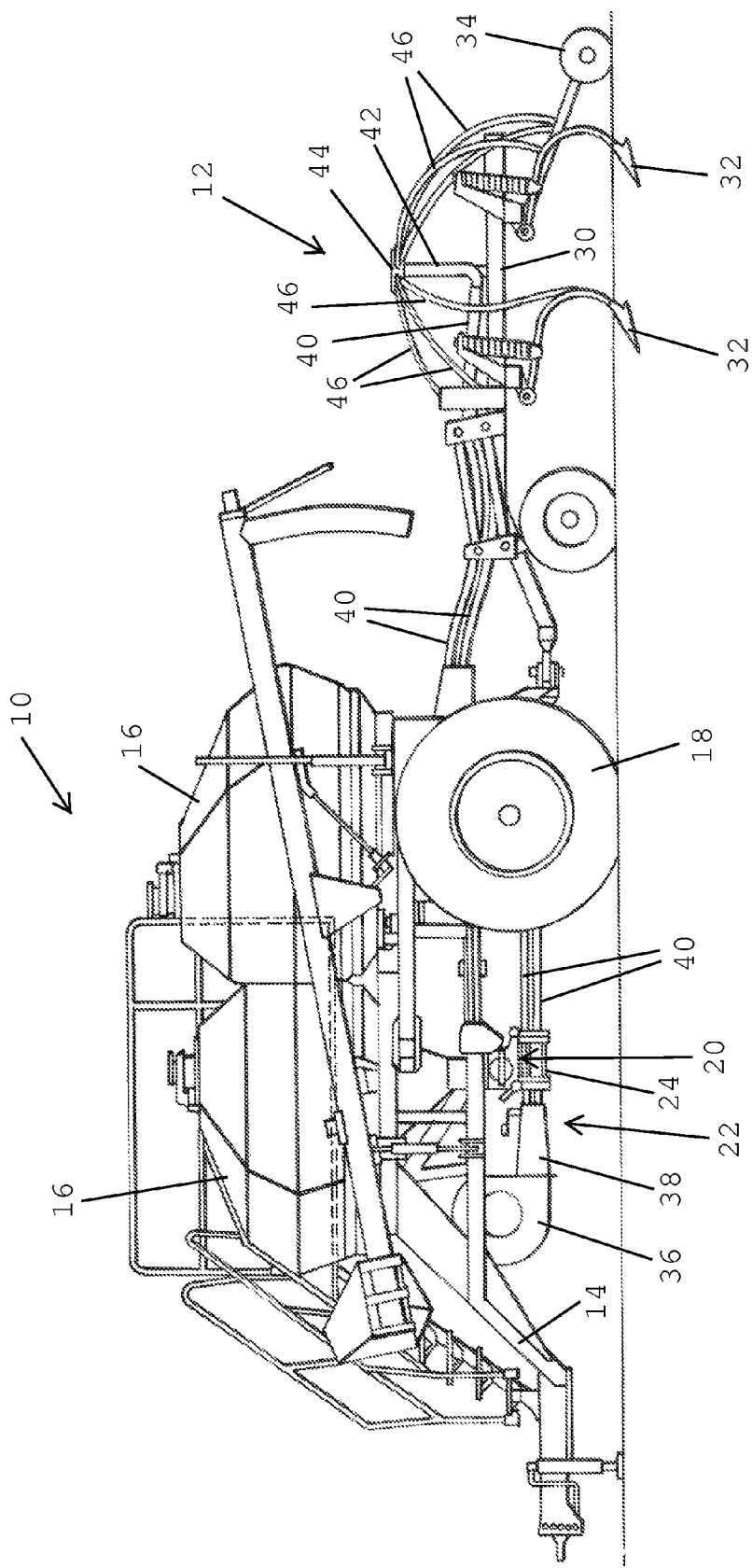
FIG. 1 is a side elevation view of an air seeder and tilling implement having the sectional meter shut-off of the present invention.

An air seeder constructed according to a preferred embodiment of the present invention is shown in the figures. With reference to FIG. 1, an air seeder is shown comprising of a seed cart 10 towed between a tractor (not shown) and a tilling implement 12. The seed cart 10 has a frame 14 to which product tanks 16 and wheels 18 are mounted. Each product tank 16 has an associated metering system 20 at its lower end for controlled feeding of product into a pneumatic distribution system 22 at a primary distribution manifold 24. The tilling implement 12, towed behind the seed cart 10, consists generally of a frame 30 to which ground openers 32 are mounted. Incorporation of seed row finishing equipment such as closing wheels 34 is also desirable in many applications.

The pneumatic distribution system 22 includes a centrifugal fan 36 connected to a plenum 38, which is in turn connected to one or more primary distribution manifolds 24, each associated with a product tank 16. The individual passages in the primary distribution manifold 24 are each connected by a distribution line 40 to a riser tube 42, only one of which is shown. Each riser tube 42 is in turn coupled to a secondary distribution header 44. Distribution lines 46 connect the secondary distribution header 44 to seed boots mounted on the ground openers 32 to deliver product, seed or fertilizer, etc. to the furrow formed by the openers 32. Further detail of the air seeder can be found in U.S. Pat. No. 5,878,679, hereby incorporated by reference. While the air seeder of FIG. 1 is shown as a separate air cart connected to a tilling implement, the product tanks 16, metering system 20 and distribution system 22 can be mounted to the same frame as the ground openers 32.

Figure 2:
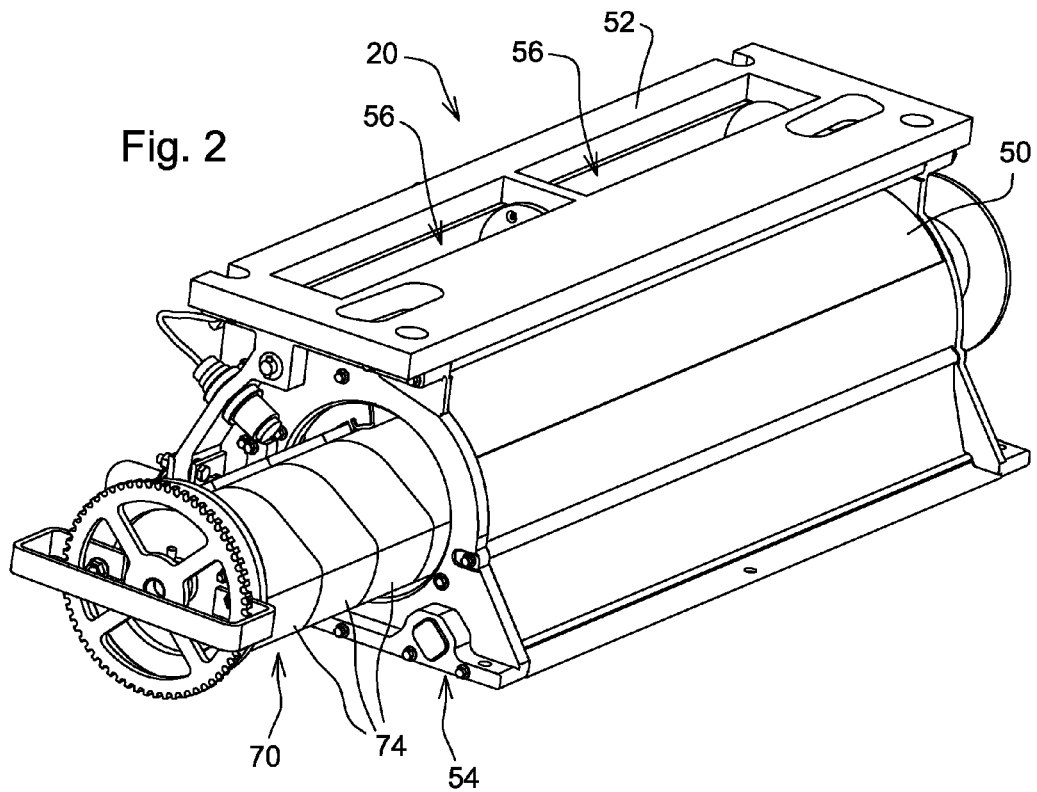
FIG. 2 is a side perspective view of the meter housing of the air seeder of FIG. 1 with the meter cartridge partially withdrawn from the meter housing.
Figure 3:
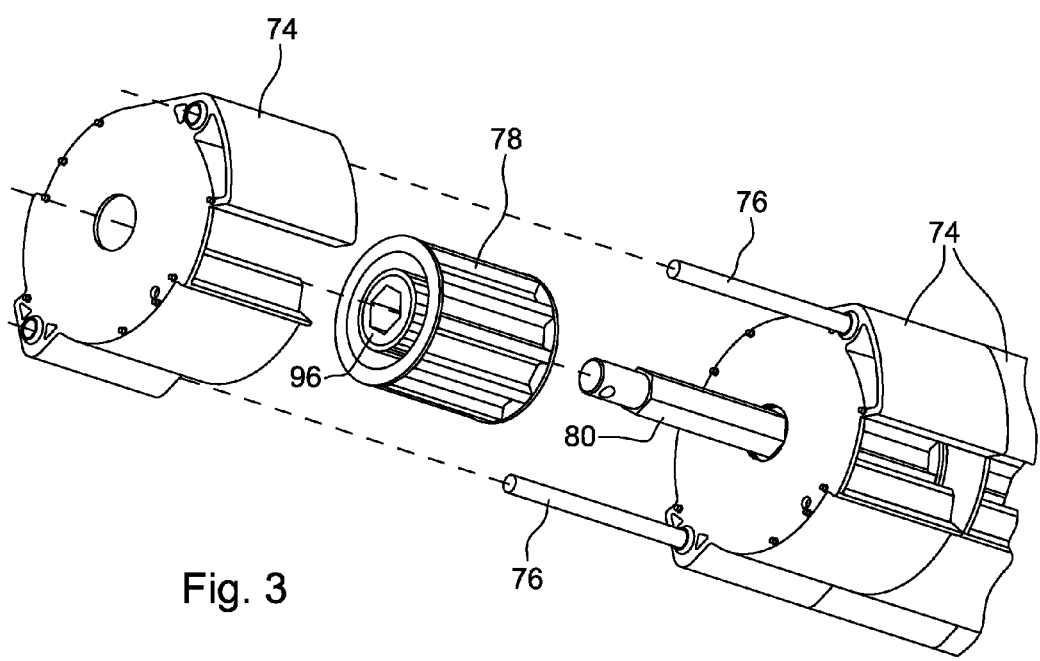
FIG. 3 is a partially exploded perspective view of the meter cartridge of the present invention.

FIGS. 2 and 3 show the metering system 20 in greater detail. Metering system 20 includes a housing 50 having an upper end 52 that is coupled to a product tank 16. The housing 50 further has a lower end 54 that is coupled to the primary manifold 24 of the pneumatic distribution system. The housing 50 forms an inlet passage 56 through which product is received into the housing and an outlet passage (not shown) through which metered product is delivered to the distribution system.

The inlet passage 56 leads to a meter cartridge 70 which houses a meter roller. The cartridge 70 is removable from the meter housing 50 as shown in FIG. 2 where the cartridge 70 is shown partially withdrawn from the housing 50. The cartridge consists of a plurality of meter casings 74 placed adjacent to one another and fastened together by elongated bolts 76 extending through apertures in the meter casings. The meter roller is comprised of a plurality of roller segments 78 axially positioned along a drive shaft 80 and driven in rotation thereby. Additional attaching hardware is shown and described in the above referenced U.S. Pat. No. 5,878,679.

Figure 4:
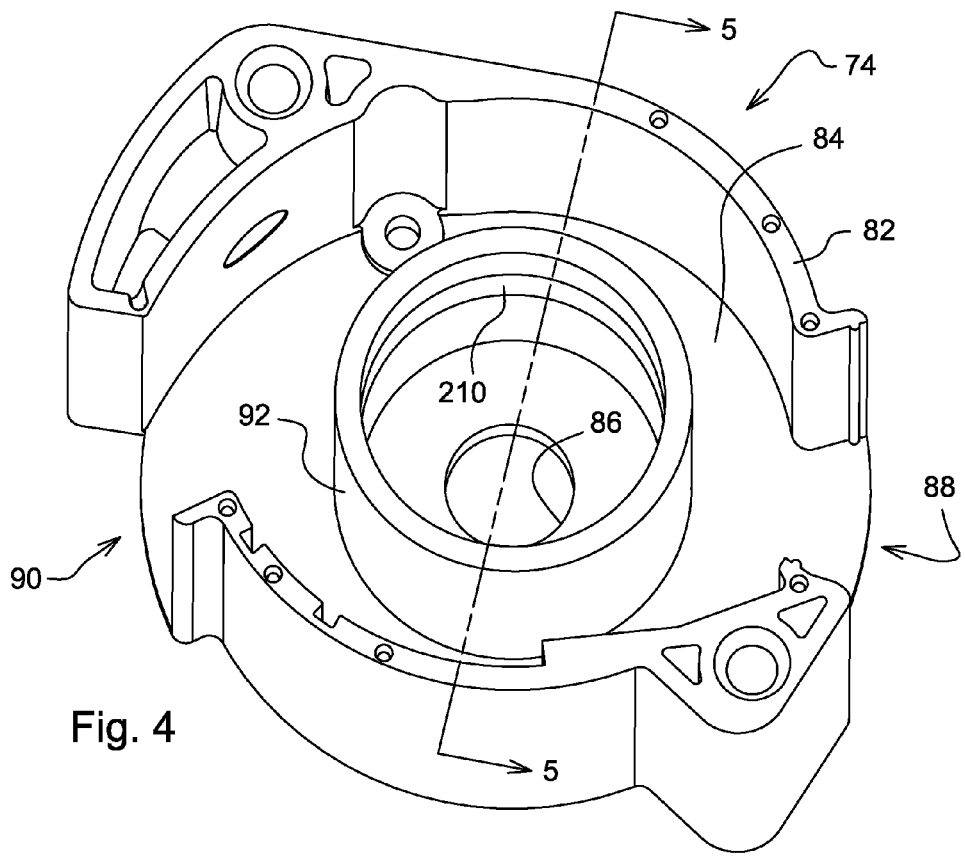
FIG. 4 is a perspective view of one meter casing of the meter cartridge of FIG. 3.

With reference to FIG. 4 a meter casing 74 is shown and described. Casing 74 is a generally cylindrical body 82 having an end wall 84 at one end thereof. The end wall has an aperture 86 to allow the drive shaft 80 to pass there through. The cylindrical body 82 forms an inlet 88 to allow product to flow into the casing for metering, and an outlet 90 through which metered product is discharged from the casing. An intermediate cylindrical wall 92 extends axially from the end wall 84 approximately half the axial length of the casing 74. The wall 92 is radially intermediate the aperture 86 and the wall forming the body 82. To selectively control the rotation of the roller segment 78, a clutch cartridge 96 is positioned radially between the drive shaft 80 and the roller segment 78.

Figure 5:
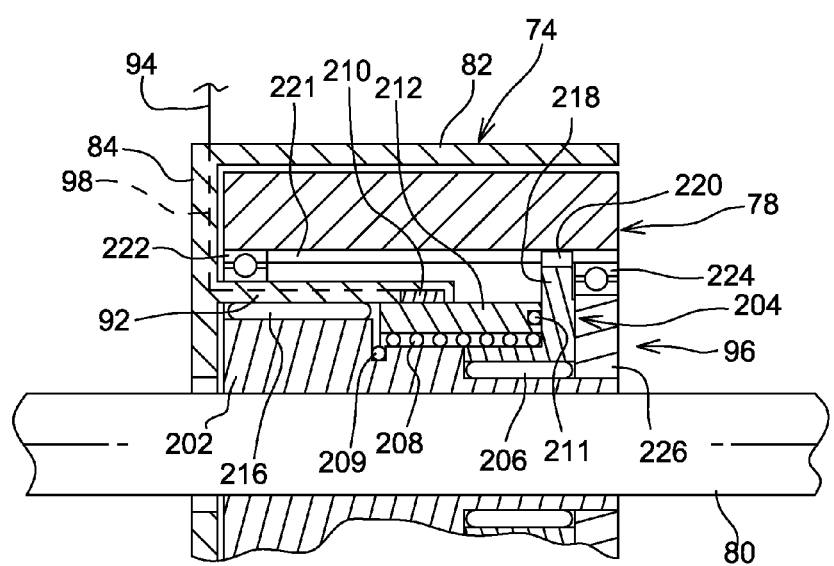
FIG. 5 is a sectional view of the meter casing, roller segment and clutch cartridge according to the invention.

FIG. 5 shows the meter casing and roller segment 78 assembled and shows the clutch cartridge 96 in greater detail. A clutch cartridge 96 is shown to selectively drive one of the individual roller segments 78. Each roller segment on the shaft 180 is preferably provided with a clutch cartridge 96. A clutch input element 202 has a hex shaped bore to fit on and rotate with the hex shaped drive shaft 80. The radially outer surface of the input element 202 is circular in shape. A clutch output element 204 is mounted on a journal or needle bearing 206. A spring element 208 is set to spin with the input element 202 and is adapted to selectively engage or disengage output element 204. The spring has an inward bent end 209 that seats into an aperture in the clutch input element 202 to ensure rotation of the spring with the input element. A sleeve 212 is positioned over the spring and is allowed to move axially. The sleeve 212 has a slot at one end, the right end as viewed in FIG. 5, which receives the outwardly bent end 211 of the spring 208. A magnetic attraction biases the sleeve 212 to the right, against the clutch output element 204. In this position, the sleeve stretches the spring 208 to cause it to tighten about the clutch output element, causing the output element to rotate along with the clutch input element 202. The output element 204 has a radially outward extending wall 218 terminating in splines or teeth 220. The splines 220 mesh with complementary splines 221 on the inner bore of the roller segment 78 for turning the roller segment. The roller segment 78 is mounted upon bearings 222 and 224. Bearing 222 is mounted on the intermediate wall 92 while bearing 224 is mounted on a spacer 226.

A coil 210 is mounted to the intermediate wall 92 near the left end of the sleeve 212. When the coil is energized, the sleeve moves to the left, allowing the spring to contract axially, which in turn expands the spring radially. This disengages the spring from the output element, stopping the drive of the output element and stopping the rotation of the roller element 78. As shown, the spring element 208 is arranged to couple the input and output elements in the absence of a signal to the coil 210. It should be apparent to those skilled in the art that the spring element 208 may alternatively be affixed to the output element and/or may be actuated to connect the input and output elements when a signal is present. A wire 94 is carried in a groove 98 on the walls 92 and 84 to energize the coil 210.

Figure 6:
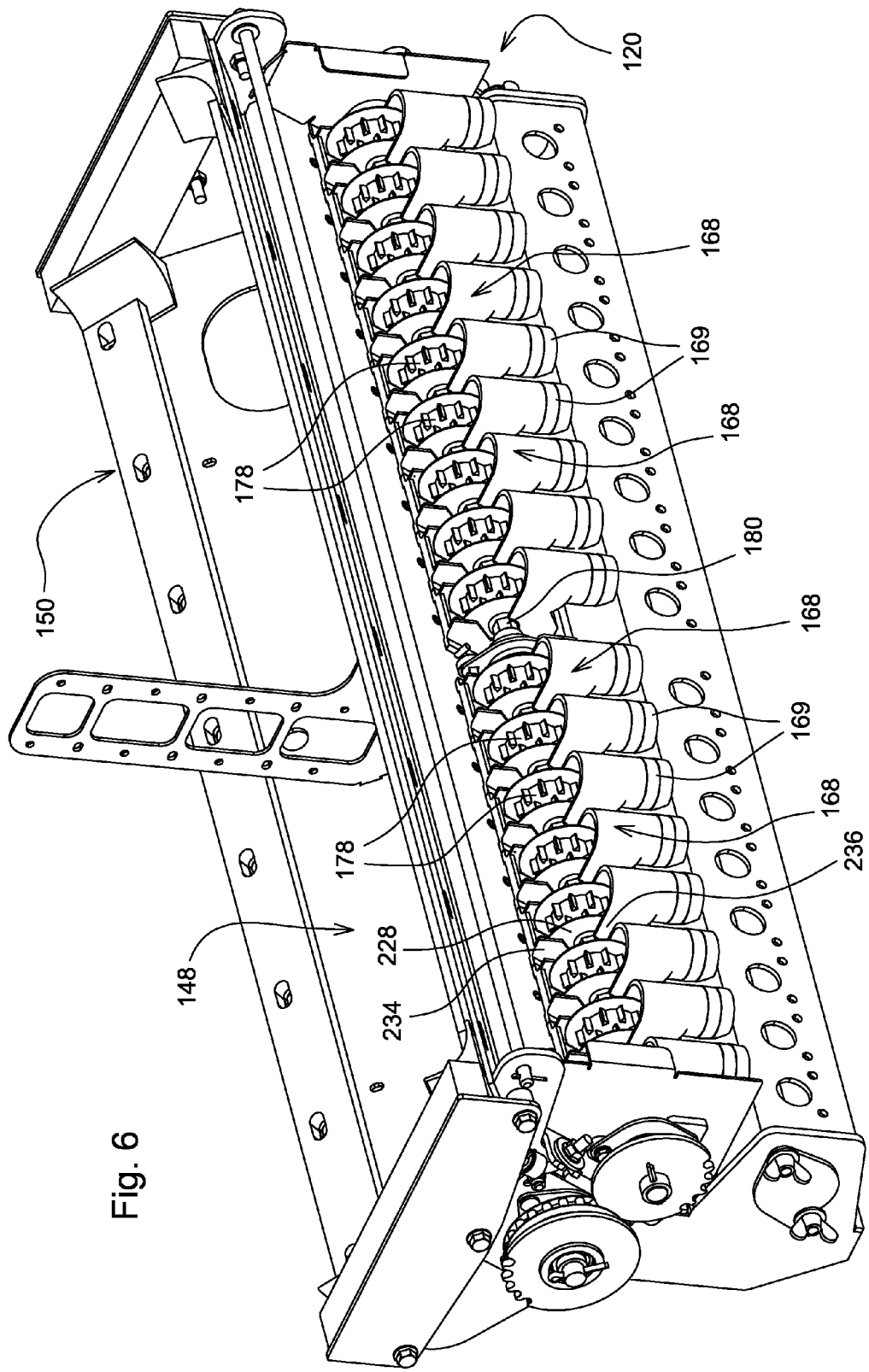
FIG. 6 is perspective view of another meter assembly used in an air seeder equipped with the present invention.

An alternative implementation of the invention is shown in FIG. 6. Here the invention is incorporated into a different meter, in this case, the meter is from a John Deere 1990CCS No-Till Air Drill. The metering system 120 includes a meter box assembly 150 upon which a product tank (not shown) is supported and supplies product into the open interior 148 of the meter box assembly. A metering system drive shaft 180 is supported by meter box assembly and carries a meter roller having a plurality of roller segments 178. The roller segments 178 are axially spaced from one another along the length of the drive shaft 180. Surrounding each roller segment is a feed cup 168 which is open to the interior 148 of the meter box assembly to receive product therefrom. Each feed cup 168 also forms an outlet tube 169 to direct product to the air stream of a product distribution system (not shown).

Figure 7:
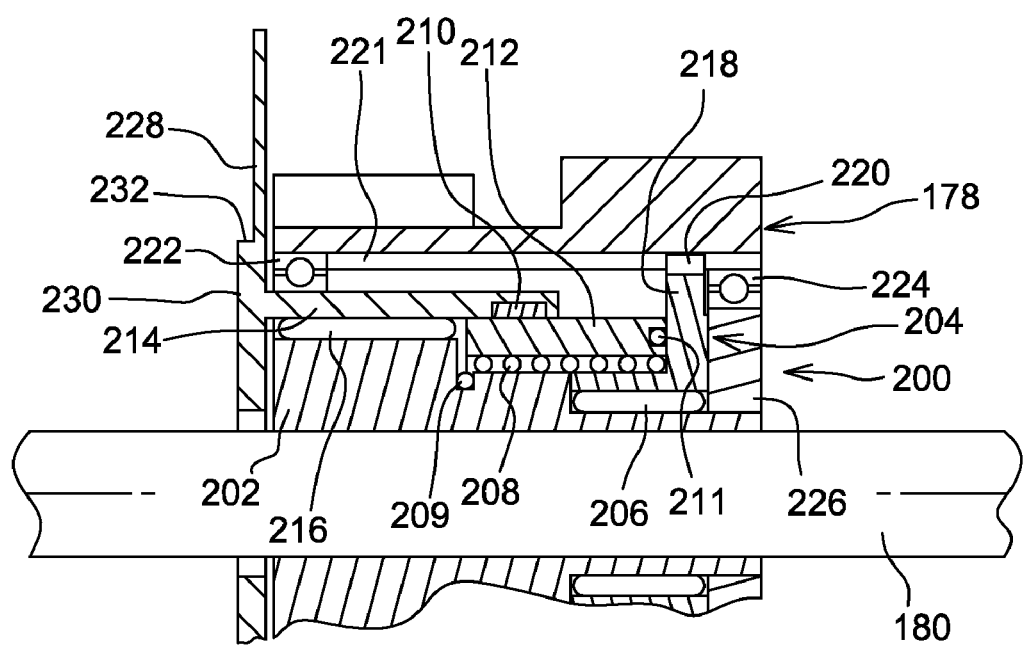
FIG. 7 is a sectional of a roller segment and clutch cartridge of FIG. 6.

With reference to FIG. 7, a clutch cartridge 200 is shown to selectively drive a roller segment 178. The cartridge 200 is generally identical to the clutch cartridge 96 described above. Only the differences are described below. The coil 210 is mounted to a stationary cylindrical wall 214 that in turn is mounted over the input element by a journal or needle bearing 216. The cylindrical wall 214 is formed as part of a side wall 228 at one axial end of the roller segment. The wall 228 has an axial projection 230 having opposite parallel edges 232 that fit between walls 234 and 236 of the feed cups 168.

The radially internal clutch cartridge allows the roller segments to be selectively disengaged to stop rotation thereof. This enables to the flow of seed to be stopped without requiring the meter housing to be emptied of seed. Further, by stopping rotation of the roller segment, there is no need for the meter housing to empty of seed before the flow of seed at the furrow is stopped and there is no possibility that a rotating roller segment will damage seed held in the meter housing. Further, the flow of seed or other product is stopped before it is mixed with other products in the air distribution system. Thus all of the problems outlined above are addressed with the present invention. The clutch cartridge shown and described is only one example of a clutch mechanism. Any clutch that can be packaged in the radial space between the drive shaft and roller segment can be used. The term "clutch" is used herein in its broadest sense to mean any of various devices for engaging and disengaging a shaft or of a shaft and a driven device.

Having described the preferred embodiment, it will become apparent that various modifications can be made without departing from the scope of the invention as defined in the accompanying claims.

The invention claimed is:

1. A volumetric metering system for metering a product in a seeding machine having a product tank and a distribution system for distributing the metered product having a plurality of separate product runs, said metering system comprising:
   a meter roller having a plurality of roller segments aligned along a roller axis for metering product from the tank to the distribution system;
   a common drive shaft extending through the roller segments to rotational drive the roller segments; and
   at least one roller segment having a clutch mechanism located radially within said at least one roller segment, between said at least one roller segment and said drive shaft, to selectively drivingly couple and drivingly de-couple said at least one roller segment to and from said drive shaft, said clutch mechanism being substantially contained within said at least one roller segment.

2. The volumetric metering system of claim 1 wherein each of said roller segments is provided with a clutch mechanism located radially within each said roller segment, between each said roller segment and said drive shaft, to selectively drivingly couple and drivingly de-couple each said roller segment to and from said drive shaft.

3. The volumetric metering system of claim 1 wherein the clutch mechanism is normally drivingly engaged and selectively drivingly disengaged.

4. The volumetric metering system of claim 1 wherein the clutch mechanism is electronically disengaged.

5. The volumetric metering system of claim 1 wherein the at least one roller segment has a splined inner bore.

6. The volumetric metering system of claim 1 wherein the at least one roller segment is mounted on bearings to allow the at least one roller segment to remain stationary while the drive shaft is rotating.

7. The volumetric metering system of claim 1 wherein the clutch mechanism includes a clutch input member mounted to the drive shaft for rotation therewith, a clutch output member coupled to the respective roller segment and a spring member selectively coupling the clutch input and output members to one another.

8. The volumetric metering system of claim 7 wherein the clutch mechanism is normally engaged to drive the at least one roller segment.

9. The volumetric metering system of claim 8 wherein the spring member is electromagnetically disengaged to drivingly de-couple the at least one roller segment from the drive shaft.

* * * * *